C. W. HODGES.
ANTISLIP DEVICE FOR VEHICLE WHEELS.
APPLICATION FILED JULY 26, 1916.
1,325,245.
Patented Dec. 16, 1919.
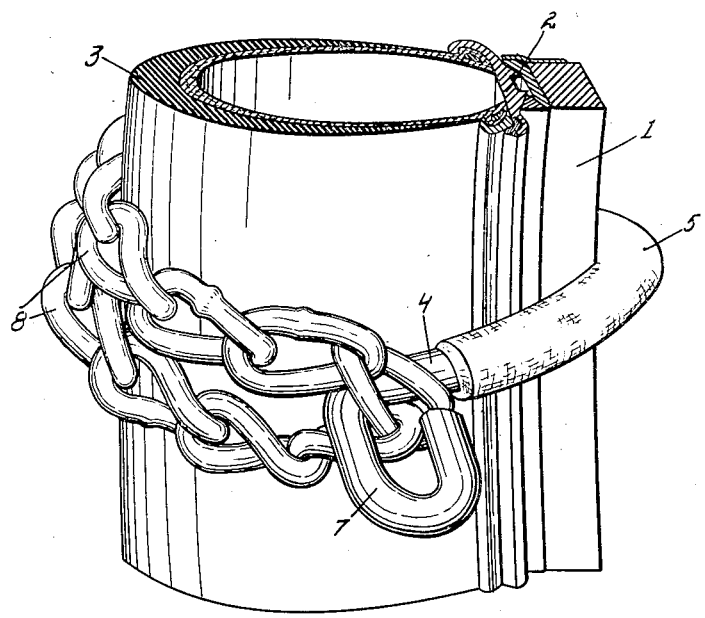
Fig. I.
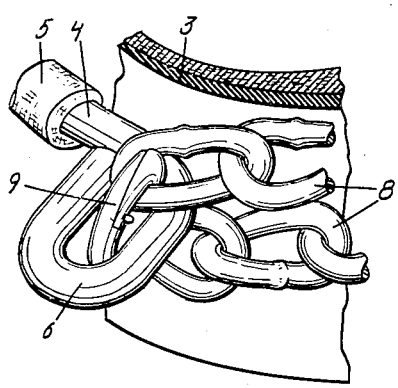
Fig. II.
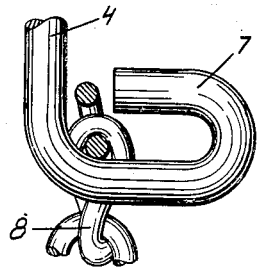
Fig. III.
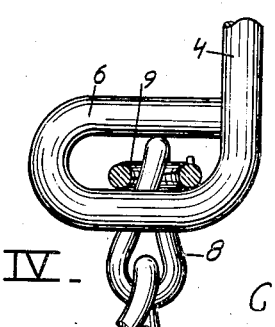
Fig. IV.
WITNESSES:
Luther Blake
Lenn Gilman
INVENTOR.
Chauncey W. Hodges
BY Chappell Earl
ATTORNEYS.

UNITED STATES PATENT OFFICE.

CHAUNCEY W. HODGES, OF GRAND RAPIDS, MICHIGAN.

ANTISLIP DEVICE FOR VEHICLE-WHEELS.

1,325,245.  Specification of Letters Patent.  Patented Dec. 16, 1919.

Application filed July 26, 1916. Serial No. 111,345.

*To all whom it may concern:*

Be it known that I, CHAUNCEY W. HODGES, a citizen of the United States, residing at the city of Grand Rapids, in the county of Kent and State of Michigan, have invented certain new and useful Improvements in Antislip Devices for Vehicle-Wheels, of which the following is a specification.

This invention relates to improvements in antislip devices for vehicle wheels.

The main objects of this invention are:

First, to provide an improved anti-slip device for vehicle wheels which is very efficient and one which is very easily and quickly applied to or removed from the wheel.

Second, to provide an improved anti-slip device for vehicle wheels which is durable and not likely to damage or cause excessive wear on the tire and also is simple and economical in structure.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Figure I is a detail perspective view of a portion of a pneumatic tired wheel with one of my improved anti-slip devices applied thereto.

Fig. II is a detail perspective view of a portion of the side of the wheel opposite that shown in Fig. I.

Fig. III is a detail side view of one end of the body member or yoke of my improved anti-slip device, the link engaged with the yoke being shown in section.

Fig. IV is a detail side view of the other end of the body member or yoke of my improved anti-slip device, the link engaged with the yoke being shown in section.

In the drawing, similar reference characters refer to similar parts throughout the several views.

Referring to the drawing, 1 represents the felly of a motor vehicle wheel, 2 a rim and 3 a pneumatic tire. These parts are shown in conventional form, being shown merely to illustrate an application of my improved anti-slip device in use.

The yoke or body member 4 is adapted to embrace the felly and rim and the sides of the tire. This yoke is in practice preferably formed of a round rod and covered with a tube 5 of rubber composition to prevent marring the felly. The yoke is provided with an integral outwardly projecting closed loop 6 at one end and an open loop or hook 7 at the other end. I preferably make the yoke of sufficient length so that these loops lie close enough to the tread so that they constitute grip members when the wheels encounter deep mud, or sand. The grip or tread chain 8 is continuous being provided with a split link 9 for convenience in assembling. This split link 9 is engaged in the closed loop 6 so that the link is retained in the loop, that is, the chain can not slip through the loop. The chain is detachably engaged with the other loop and is slidable or may slip therethrough.

My improved anti-slip device has a double cross or tread chain, the parallel parts of which are, however, kept apart so that they do not ride upon each other. The chain being non-slidably engaged with one loop, or with one end of the yoke permits the use of a simple form split link for making the chain continuous and the closed loop prevents loss of the chain. The device has great gripping and traction power, the loop ends of the yoke coming into action in mud, sand and other conditions so that the strain is not all sustained by the tread chain.

The open hook allows the endless chain to slip and gives perfect freedom under all conditions and permits the ready engagement and disengagement of the device.

Having thus described my invention, what I claim as new and desire to secure by Letters Patent is:

1. The combination with a yoke member adapted to embrace the felly of a wheel and provided with loops at its ends, one of the loops being closed and the other open, and a continuous tread chain disposed through said loops and comprising a split link engaged and retained in the closed loop, the chain being slidable through and disengageable from the open loop, the said loops projecting outwardly a substantial distance beyond the adjacent portions of said tread chain and constituting grip members for engaging deep mud or sand.

2. The combination with a yoke member adapted to embrace the felly of a wheel and provided with loops at its ends, one of the loops being closed and the other open, and a continuous tread chain disposed through said loops and comprising a split link engaged and retained in the closed loop, the chain being slidable through and disengageable from the open loop.

3. The combination with a yoke member adapted to embrace the felly of a wheel and provided with loops at its ends, and a continuous tread chain disposed through said loops, the chain being slidable through and disengageable from one loop and non-slidably engaged with the other loop, the said loops projecting outwardly a substantial distance beyond the adjacent portions of said tread chain and constituting grip members for engaging deep mud or sand.

4. The combination with a yoke member adapted to embrace the felly of a wheel and provided with loops at its ends, and a continuous tread chain disposed through and disengageable from one loop and non-slidably engaged with the other loop.

5. The combination with a yoke member adapted to embrace the felly of a wheel and provided with loops at its ends and a continuous tread chain disposed through said loops, the chain being slidable through one loop and non-slidably engaged with the other loop, the said loops projecting outwardly a substantial distance beyond the adjacent portions of said tread chain and constituting grip members for engaging deep mud or sand.

6. The combination with a yoke member adapted to embrace the felly of a wheel and provided with loops at its ends, and a continuous tread chain disposed through said loops, the chain being slidable through one loop and non-slidably engaged with the other loop.

7. The combination with a yoke member adapted to embrace the felly of a wheel and provided with loops at its ends and a continuous tread chain disposed through said loops, the said loops projecting outwardly a substantial distance beyond the adjacent portions of said tread chain and constituting grip members for engaging deep mud or sand.

In witness whereof, I have hereunto set my hand and seal in the presence of two witnesses.

CHAUNCEY W. HODGES. [L. S.]

Witnesses:
JOHN J. VERIOYS,
MYRTLE Z. SCHRAM.